(12) United States Patent
Bauer et al.

(10) Patent No.: US 11,375,160 B2
(45) Date of Patent: Jun. 28, 2022

(54) COOKING APPLIANCE HAVING A CAMERA AND METHOD FOR OPERATING A COOKING APPLIANCE

(71) Applicant: BSH Hausgeräte GmbH, Munich (DE)

(72) Inventors: Hans-Jürgen Bauer, Traunstein (DE); Helmut Schlagberger, Waging (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 17/284,484

(22) PCT Filed: Oct. 8, 2019

(86) PCT No.: PCT/EP2019/077160
§ 371 (c)(1),
(2) Date: Apr. 12, 2021

(87) PCT Pub. No.: WO2020/074475
PCT Pub. Date: Apr. 16, 2020

(65) Prior Publication Data
US 2021/0360203 A1 Nov. 18, 2021

(30) Foreign Application Priority Data
Oct. 10, 2018 (DE) ..................... 10 2018 217 324.9

(51) Int. Cl.
*H04N 5/91* (2006.01)
*H04N 7/18* (2006.01)
(Continued)

(52) U.S. Cl.
CPC ............ *H04N 7/183* (2013.01); *A47J 36/321* (2018.08); *F24C 7/085* (2013.01); *G06V 40/10* (2022.01); *H04N 5/91* (2013.01)

(58) Field of Classification Search
None
See application file for complete search history.

(56) References Cited

U.S. PATENT DOCUMENTS 4,711,975 A 12/1987 Morel
9,982,895 B2 5/2018 Ruther
(Continued)

FOREIGN PATENT DOCUMENTS

DE 102011002187 A1 10/2012
DE 102017203305 A1 9/2018
(Continued)

OTHER PUBLICATIONS

National Search Report DE 10 2018 217 324.9 dated Sep. 5, 2019.
International Search Report PCT/EP2019/077160 dated Dec. 12, 2019.

*Primary Examiner* — Eileen M Adams
(74) *Attorney, Agent, or Firm* — Michael E. Tschupp; Andre Pallapies; Bradon G. Braun

(57) ABSTRACT

A cooking appliance includes a cooking compartment having a loading opening and a cooking compartment door for closing off the loading opening, with the cooking compartment door including a viewing window. A camera is directed into the cooking compartment for recording an image in the cooking compartment. Coupled to the camera is an image processing facility which is configured to anonymize an image region in the image recorded by the camera.

12 Claims, 4 Drawing Sheets

(51) Int. Cl.
*A47J 36/32* (2006.01)
*F24C 7/08* (2006.01)
*G06V 40/10* (2022.01)

(56) References Cited

U.S. PATENT DOCUMENTS

| | | |
|---|---|---|
| 10,674,569 B2 | 6/2020 | Kaiser |
| 10,956,752 B2 | 3/2021 | Ackermann |
| 2010/0182136 A1 | 7/2010 | Pryor |
| 2011/0037852 A1* | 2/2011 | Ebling ............... G06K 9/00778 348/143 |
| 2016/0231731 A1* | 8/2016 | Carver ................... A47B 21/00 |
| 2016/0327279 A1* | 11/2016 | Bhogal ..................... A23L 5/17 |
| 2017/0000292 A1 | 1/2017 | Jung |
| 2017/0084065 A1* | 3/2017 | Gordon .................. G06T 11/60 |
| 2017/0223774 A1* | 8/2017 | Cheng ..................... F24C 7/085 |
| 2018/0202667 A1 | 7/2018 | Cheng |
| 2019/0242584 A1 | 8/2019 | Ebert |

FOREIGN PATENT DOCUMENTS

| | | |
|---|---|---|
| EP | 0899512 A1 | 3/1999 |
| WO | 2009138359 A2 | 11/2009 |

\* cited by examiner

COOKING APPLIANCE HAVING A CAMERA AND METHOD FOR OPERATING A COOKING APPLIANCE

CROSS-REFERENCES TO RELATED APPLICATIONS

This application is the U.S. National Stage of International Application No. PCT/EP2019/077160, filed Oct. 8, 2019, which designated the United States and has been published as International Publication No. WO 2020/074475 A1 and which claims the priority of German Patent Application, Serial No. 10 2018 217 324.9, filed Oct. 10, 2018, pursuant to 35 U.S.C. 119(a)-(d).

BACKGROUND OF THE INVENTION

The invention relates to a cooking appliance, having a cooking compartment with a loading opening, a cooking compartment door for closing off the loading opening, which has a viewing window, and a camera directed into the cooking compartment. The invention also relates to a method for operating such a cooking appliance. In particular, the invention advantageously can be applied to ovens and/or microwave appliances, which in particular may be embodied as household appliances.

EP 0 899 512 A1 discloses a cooking appliance with a heatable cooking compartment for cooking a food to be cooked and with an optical facility for capturing the food to be cooked and depicting it on a monitor, wherein the optical facility and in particular the monitor are an integrated constituent part of the cooking appliance.

WO 2012/146523 A1 discloses an oven door, which is determined to be fastened to a household or industrial oven, and serves to close off an opening on a muffle of the oven, wherein the oven door is equipped with an outer and an inner wall and at least one image recording apparatus, wherein the at least one image recording apparatus is arranged inside the door between the outer and inner wall and is adapted to record images of the interior of the muffle, and wherein at least one part of the outer side of the outer wall has a heat sink that is thermally coupled to the image recording device.

DE 10 2011 002 187 A1 discloses a household appliance with a treatment compartment and a door that closes off the treatment compartment. The treatment compartment is assigned a camera that is suitable and is embodied for forwarding images recorded from the treatment compartment to a display facility.

US 2017/000292 A1 discloses an oven with a monitoring unit that monitors a cooking compartment and transfers data that is obtained by the monitoring to an external apparatus via a network, in order to make it possible for a user to monitor a cooking process of the oven by way of the external apparatus without directly monitoring the oven.

WO 2016/034295 A1 relates to a household appliance, in particular a cooking oven, with a camera. The household appliance comprises a treatment chamber and a door for opening and closing the treatment chamber. The door contains a window or a transparent part. The door comprises a door handle that is arranged on an outer side of the door. The camera is arranged inside the door handle, wherein the lens coverage of the camera extends from the camera, through the window or the transparent region of the door and into the interior of the treatment chamber. Image signals generated by the camera are represented or can be represented by an image display facility, wherein the image display facility is part of the control unit of the household appliance and/or part of an external facility that is or can be connected.

WO 2009/138359 A1 discloses a household appliance with image capturing apparatus, in particular with internal image capturing apparatus, a method for capturing an internal state or operating state of such a household appliance and also a method for reducing thermally induced energy losses in a household appliance that is to be opened and closed, in particular a refrigeration appliance or heating appliance, with a cavity in which a thermodynamic system can be accommodated.

U.S. Pat. No. 4,711,979 discloses a viewing apparatus that makes it easier to view inside a microwave oven when preparing a food product or the like in a microwave treatment process. The viewing apparatus contains a tubular support which can be extended through an opening that is embodied in a side wall of a microwave oven and which extends in the immediate vicinity of a food product that is being subjected to a microwave treatment in the oven. The viewing apparatus contains an element that consists of telescopic tubular sections; the length of said element can essentially be varied according to the size of the food product contained in the microwave oven by adding or removing sections, and which includes a grid structure for carrying an optical viewing apparatus in and in a coaxial relationship with the tubular element; with the optical viewing apparatus, such as an endoscope, fiberscope, borescope or the like, being guided from the microwave oven toward the outside into an operative connection with a suitable photographic or video recording apparatus.

As a rule, the camera in the oven is used to forward a still or moving image of the food to be cooked to a user terminal such as a smartphone or a tablet computer. In some ovens, it is disadvantageous in this context that the privacy of persons located in front of the oven could be breached, as the camera makes it possible to view the persons depending on the positioning.

BRIEF SUMMARY OF THE INVENTION

The object of the present invention is to overcome the disadvantages of the prior art at least partially and in particular to provide an option for viewing a cooking compartment of a cooking appliance with improved protection of privacy or of personal rights.

This object is achieved in accordance with the features of the independent claims. Advantageous embodiments are the subject matter of the dependent claims, the description and the drawings.

This object is achieved by a cooking appliance, having a cooking compartment with a loading opening, a cooking compartment door for closing off the loading opening, which has a viewing window, and a camera directed into the cooking compartment, which is coupled to an image processing facility, wherein the image processing facility is configured to anonymize at least one image region in an image recorded by the camera.

This cooking appliance produces the advantage that it is possible for a user to be provided with an image of the cooking compartment for viewing purposes, in which possible persons depicted are no longer recognizable. The privacy of persons that are located in front of the cooking appliance is therefore protected. An anonymized image can also be sent via the Internet or another data network, e.g. to a mobile user terminal of the user of the cooking appliance or also of other persons, without the risk of persons being tracked. Moreover, such a cooking appliance can be implemented in a particularly simple and economical manner.

The cooking appliance may be an oven, a microwave oven, a steam treatment appliance or any given combination thereof. The cooking appliance is in particular a household appliance.

The cooking compartment serves to accommodate food to be cooked for the treatment thereof by way of the cooking appliance, in particular for treatment by heat, microwaves and/or steam. The food to be cooked can be introduced into the cooking compartment or removed from the cooking compartment through the loading opening.

Food to be cooked that is located in the cooking compartment can be seen by persons located in front of the cooking appliance through the viewing window. Additionally, light given off by persons located in front of the cooking appliance is able to enter the cooking compartment, where it is depicted. By way of the camera directed into the cooking compartment, it is possible to record an image of the cooking compartment, including food to be cooked that is accommodated therein. Consequently, the depictions of said persons in the cooking compartment may be present in (raw) images that have been recorded by the camera.

The anonymization may comprise filling the image region with image points of a constant color (e.g. in the form of "blacking out" or the like) or with a pattern (e.g. in the form of a pixelation). The image regions of the image that are anonymized or are to be anonymized may show a specific person or also may only be suitable for showing a person even if no person is present in front of the cooking appliance.

In one embodiment, the cooking appliance has at least one data transfer facility for transferring images recorded by means of the camera—anonymized or non-anonymized—to an external instance. The data transfer facility may be embodied as a communication module. The at least one data transfer facility may be embodied in a wireless manner (e.g. in the form of a Bluetooth and/or WLAN module etc.) and/or embodied in a wired manner (e.g. in the form of an Ethernet module, etc.). The external instance may comprise a user terminal, in particular a mobile user terminal such as a smartphone, a tablet computer etc.

The image processing facility is configured to process or edit the images recorded by the camera. In particular, the camera is a digital camera.

The image processing facility being configured to anonymize at least one image region in an image recorded by the camera in particular comprises modifying or editing the image region to be anonymized such that persons depicted therein at least are no longer individually recognizable. This may comprise persons still being recognized as person types or as being persons as such, but no longer being recognized as individual persons. This may also comprise persons then not even being recognizable as persons as such.

One development is that the image processing facility is a functional component of the cooking appliance. It may be present as an independent hardware component or as an image processing function that is able to run on a unit having yet further functions, e.g. on a control facility of the cooking appliance. The control facility then also serves as the image processing facility, for example.

One development is that the image processing facility is a facility or function that can be coupled or is coupled to the cooking appliance from a data perspective and therefore is a facility or function that is external to the appliance. As a result, the advantage is achieved that the cooking appliance can be embodied in a particularly simple and economical manner. The image processing facility may be functionally provided, for example, by a network server (e.g. of the manufacturer of the cooking appliance) and/or as a cloud-based function.

In one embodiment, the cooking compartment has at least one reflective cooking compartment wall and the image processing facility is configured to anonymize at least one image region associated with the at least one reflective cooking compartment wall. This achieves the advantage that only the part of the image that corresponds to the reflective cooking compartment wall has to undergo image processing with regard to anonymization. This in turn reduces the amount of data processing needed for the anonymization. In this embodiment, use is made of the fact that non-reflective regions of the cooking compartment typically are not able to reflect a depiction of a person with sufficient focus that the associated person is individually recognizable.

In one embodiment, at least one image region that is to be or can be anonymized comprises at least one predefined image region. This produces the advantage of a particularly simple and rapid implementation of an anonymization.

In one development, the predefined image region corresponds to a region of a reflective cooking compartment wall that lies in a field of view of the camera. As a result, it can be ensured in a particularly reliable manner that no person is recognizable individually or as such in the anonymized image. In other words, the image region that corresponds to a projection of the reflective cooking compartment wall is anonymized. This image region is known in advance due to the properties of the camera (e.g. the field of view thereof) and its arrangement in relation to the cooking compartment, possibly as a function of a slide-in level used. In one variant, in the context of this development, it is also possible for the part of a food to be cooked that is located in a spatial region between the reflective cooking compartment wall and the camera to also be anonymized (in particular blacked out). Alternatively or additionally, the image processing facility may be configured to recognize food to be cooked that is located in the cooking compartment (for example by comparing with an image of an empty cooking compartment) and to depict the food to be cooked in the otherwise anonymized image region.

In one embodiment, at least one image region that can be anonymized can be determined by means of an image evaluation, in particular by the image processing facility. As a result, the advantage is achieved that a particularly small subregion of the image recorded by the camera has to be anonymized. In this embodiment, particularly due to the image content, it is determined whether a person could be depicted in a subregion of the image recorded by the camera and consequently this subregion is at least partially anonymized.

In one embodiment, the image processing facility is configured to evaluate a plurality of images recorded by means of the camera for moving image regions and at least one image region that can be anonymized corresponds to an image region that has moved. The advantage is thus achieved that it is possible to dispense with a complex object recognition in order to be able to anonymize objects that are moving or have moved, such as persons, in a targeted manner. In this context, use is made of the fact that persons located in front of a cooking appliance typically do not stand still enough that their movement cannot be detected. A moving image region therefore indicates a person and can be anonymized. In one development, in order to identify a region that is moving or has moved (in a sufficiently rapid manner), two images recorded by a camera may be compared with one another. In particular, it is then possible to anonymize image regions—particularly in the image recorded most recently—that are not present in an identical manner or are not present in a very similar manner in one of the other images.

In one embodiment, the image processing facility is configured to carry out an object recognition with regard to persons and at least one image region that can be anonymized corresponds to an image region associated with a recognized person. It is thus possible to achieve a particularly precise recognition of a person and/or a particularly small image region to be anonymized.

In one embodiment, the image processing facility is configured to only anonymize at least one image region in an image recorded by the camera if a presence of a person has been recognized in front of the cooking appliance. This reduces the amount of data processing needed and improves an information content of the image recorded by the camera, if no presence of a person has been recognized. The recognition of a person in front of the cooking appliance may for example take place optically (e.g. by way of a camera directed into a space in front of the cooking appliance) or on the basis of other physical principles.

In one embodiment, the cooking appliance has at least one person recognition facility that is configured to identify a presence of a person in front of the cooking appliance. The advantage is thus achieved that the cooking appliance is able to ascertain the presence of a person independently. The person recognition facility or at least one sensor thereof may be arranged on a front side of the cooking appliance, e.g. integrated into a front panel, the cooking compartment door, a door handle etc.

In one embodiment, the person recognition facility comprises an infrared (IR) sensor and/or an ultrasound (US) sensor. This kind of sensor enables a particularly economical and reliable recognition or detection of a presence of persons in front of the cooking appliance.

In one development, the image processing facility is configured to only anonymize at least one image region in an image recorded by the camera if a corresponding anonymization function is activated. This enables a user-controlled activation and deactivation of the anonymization function and therefore an increased user satisfaction. Thus, certain users may attach no or only little importance to the anonymization, but in exchange they appreciate as realistic an image of the cooking compartment as possible.

The object is also achieved by a system, having a cooking appliance as described above and at least one user terminal, in particular a mobile user terminal such as a smartphone, tablet computer etc., wherein the cooking appliance and the user terminal can be or are coupled to one another from a data perspective. The system may be embodied in an analogous manner to the cooking appliance and has the same advantages. In particular, the images that have been anonymized in regions can be shown on the user terminal.

The object is also achieved by a method for operating a cooking appliance, in which a camera records at least one image of a cooking compartment of a cooking appliance, at least one image region is anonymized in at least one image and the anonymized image is provided to at least one image display facility.

The method may be embodied in an analogous manner to the cooking appliance or the system and has the same advantages.

BRIEF DESCRIPTION OF THE DRAWINGS

The above-described properties, features and advantages of this invention and the manner in which these are achieved will become clearer and more readily understandable in connection with the following schematic description of an exemplary embodiment, which will be described in further detail making reference to the drawings.

DETAILED DESCRIPTION OF EXEMPLARY EMBODIMENTS OF THE PRESENT INVENTION

Figure 1:
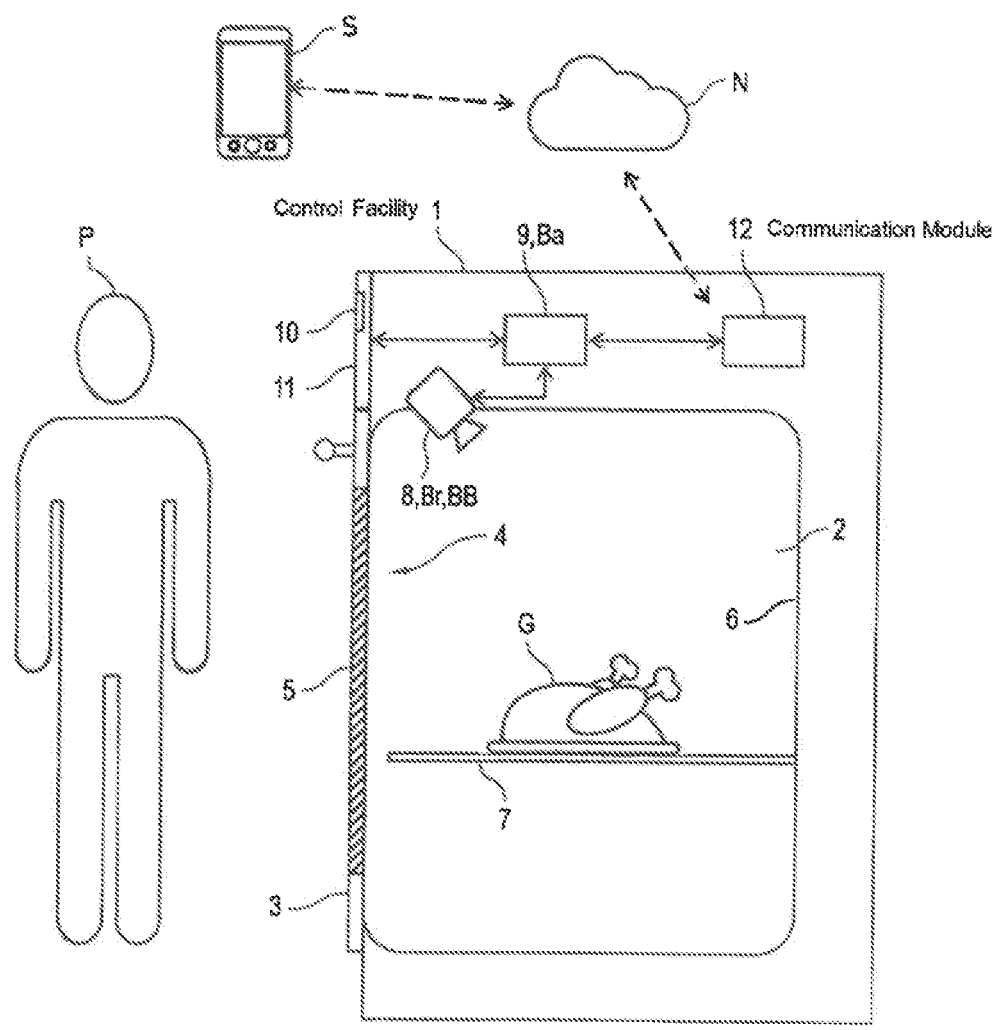
FIG. 1 shows a cross-sectional representation in a side view of a schematic diagram of a cooking appliance in the form of an oven with a camera directed into a cooking compartment of the oven.

FIG. 1 shows a cross-sectional representation in a side view of a schematic diagram of a cooking appliance in the form of an oven 1. The oven 1 has a cooking compartment 2 that has a loading opening 4 that can be closed off by means of a cooking compartment door 3 on the front side. The cooking compartment door 3 has a viewing window 5. At least one rear wall 6 of the cooking compartment 2 is embodied in an optically reflective manner. Here in the cooking compartment 2, a carrier for a food to be cooked 7 is present at an associated slide-in level, on which the food to be cooked G (here in the form of a chicken) rests.

The oven 1 further has at least one camera 8 directed into the cooking compartment 2. By means of the camera 8, it is possible for (raw) images Br of the cooking compartment 2 to be recorded. The camera 8 is embodied and arranged such that the images Br that it records typically show the food to be cooked G and at least some of the rear wall 6 of the cooking compartment 2. The camera 8 may be arranged inside the oven 1 (as shown) or outside the oven 1.

The camera 8 is coupled to an image processing facility, which here is embodied as a control facility 9 of the oven 1 with an image processing function. The control facility 9 is therefore configured to further process the images Br recorded by the camera 8 (see FIG. 3). Due to its image processing function, the control facility 9 is further configured to anonymize at least one image region BB in an image Br recorded by the camera 8 (see FIG. 3) and to provide or generate an anonymized image Ba as a result (see FIG. 4).

The control facility 9 is further connected to a person recognition facility in the form of an IR sensor 10, which is integrated in an operating panel 11 of the oven 1. The control facility 9 is configured, by means of the IR sensor 10, to ascertain a presence of persons P (giving off heat) of or on the front side of the oven 1.

The control facility 9 is additionally connected to a wireless communication module 12, such as a WLAN module or a Bluetooth module of the oven 1. The control facility 9 is configured to transfer images Br, Ba that have been recorded by the camera 8 and possibly have been anonymized to a user terminal, here in the form of a smartphone S, via the communication module 12 and possibly a data network N.

Figure 2:
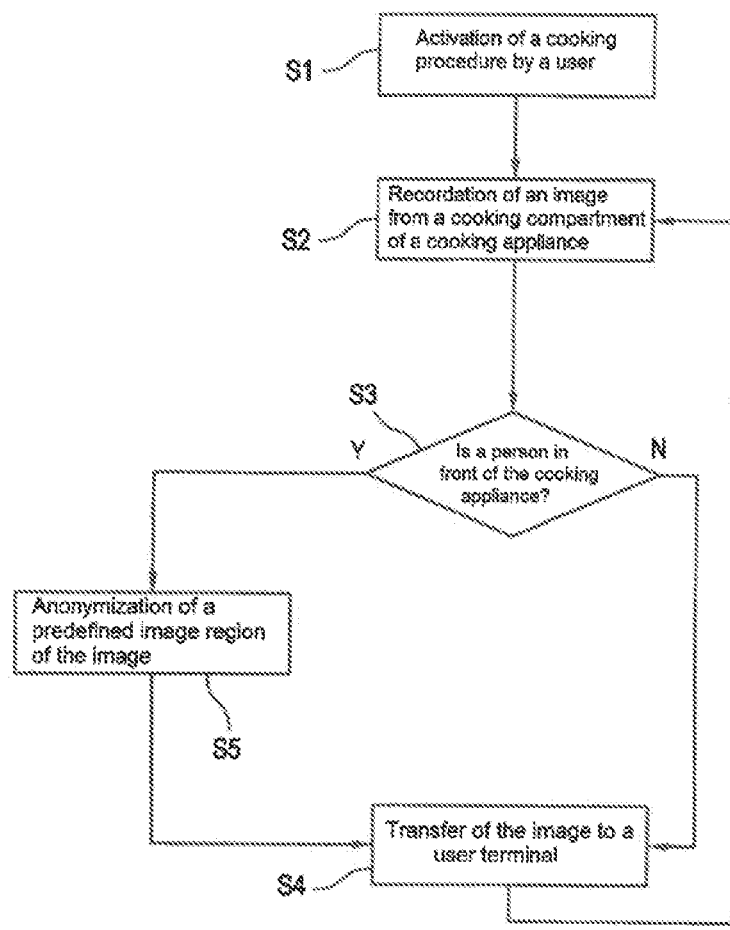
FIG. 2 shows a possible procedure for performing a method for operating the oven from FIG. 1.

FIG. 2 shows a possible procedure for performing a method for operating the oven 1.

In a step S1, a cooking procedure is activated by a user, which comprises a recording of images Br from the cooking compartment 2 by means of the camera 8.

In a step S2, at least one image Br is recorded by means of the camera 8.

In a step S3, it is queried whether a presence or absence of at least one person P in front of the oven 1 has been ascertained by means of the IR sensor 10.

If not ("N"), then the image recorded by the camera 8 is not anonymized and in a step S4 is transferred as such to the user terminal S.

If so ("Y"), then in a step S5 a predefined image region BB of the image Br is filled by blacking out, for example, and therefore anonymized by means of the control facility 9, wherein the image region BB corresponds to the region of the rear wall 6 of the cooking compartment 2 that is depicted in the image Br.

Subsequently, the image Ba anonymized in step S5 is transferred to the user terminal S, where it can be displayed on an image display facility in the form of a display.

The above steps S2 to S5 may also be run through multiple times in the context of a cooking procedure, e.g. at regular time intervals.

In one development, the anonymization is only performed if a user has undertaken or confirmed a corresponding adjustment of the oven 1.

Figure 3:
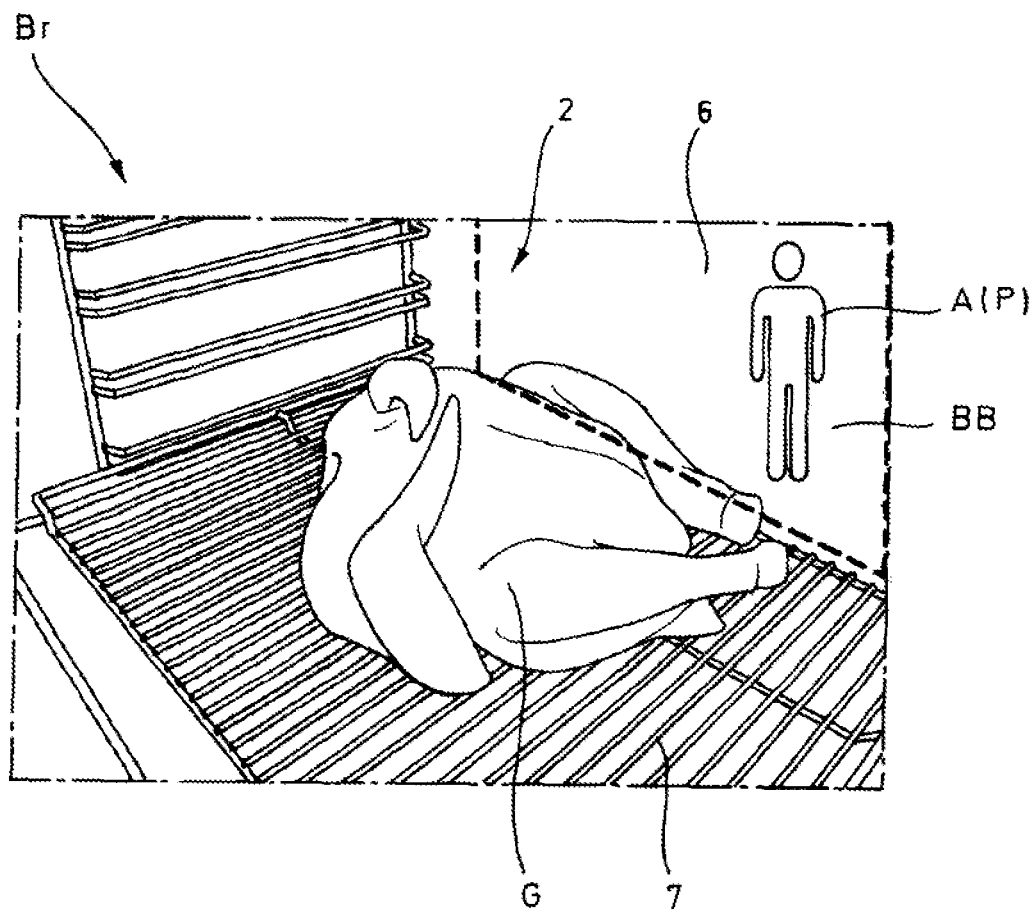
FIG. 3 shows a non-anonymized image that has been recorded using the camera of the oven from FIG. 1.

FIG. 3 shows a non-anonymized image Br that has been recorded using the camera 8 of the oven 1. The camera 8 is located in the region of a ceiling of the cooking compartment 2 or in a side wall of the cooking compartment 2 in the vicinity of the ceiling. Due to the fixed arrangement of the camera 8 in relation to the cooking compartment 2, the image region BB that depicts the reflective rear wall 6 of the cooking compartment 2 in the image Br is predefined (as indicated by the dashed contour). If a person P is located in front of the oven 1, then they can be depicted on the rear wall 6 of the cooking compartment 2, as indicated symbolically by the depiction A(P) of the person P.

Figure 4:
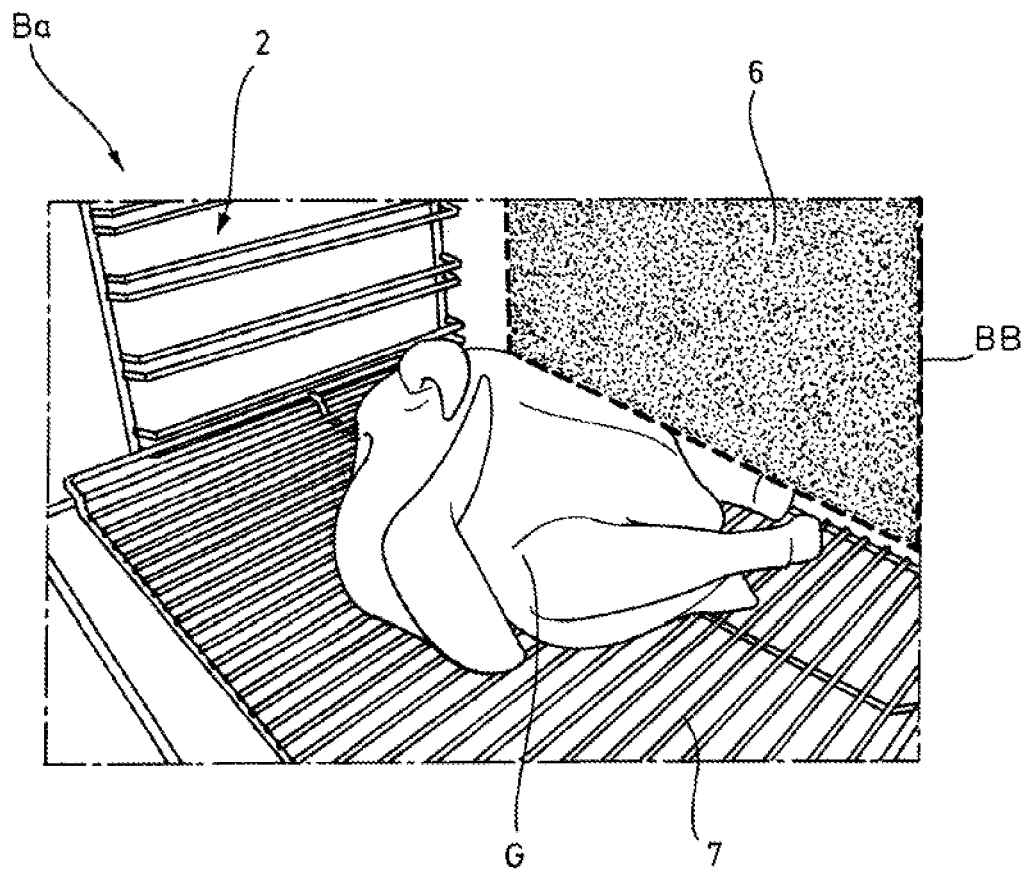
FIG. 4 shows the image from FIG. 3 after anonymization.

FIG. 4 shows an anonymized image Ba that has been generated by anonymization (here: blacking out) of the image region BB of the image Br from FIG. 3. In this context, part of the depiction of the food to be cooked G that lies inside the image region BB is also blacked out.

Naturally, the present invention is not restricted to the exemplary embodiment shown.

In general, "a", "an", etc. can be understood as singular or plural, in particular in the sense of "at least one" or "one or more", etc., provided this is not explicitly excluded, e.g. by the expression "exactly one", etc.

A numerical value can also include the given value as a typical tolerance range, provided this is not explicitly excluded.

The invention claimed is:

1. A cooking appliance, comprising:
   a cooking compartment having a loading opening;
   a cooking compartment door for closing off the loading opening, said cooking compartment door including a viewing window;
   a camera directed into the cooking compartment for recording an image in the cooking compartment; and
   an image processing facility coupled to the camera and configured to anonymize an image region in the image recorded by the camera,
   wherein the image processing facility is configured to only anonymize the image region in the image recorded by the camera when a presence of a person has been recognized in front of the cooking appliance.

2. The cooking appliance of claim 1, wherein the cooking compartment has a reflective cooking compartment wall, with the image region being associated to the reflective cooking compartment wall and anonymized by the image processing facility.

3. The cooking appliance of claim 1, wherein the image region to be anonymized comprises a predefined image region.

4. The cooking appliance of claim 1, further comprising an image evaluation configured to determine the image region to be anonymized.

5. The cooking appliance of claim 4, wherein the image processing facility includes an image evaluation to evaluate a plurality of images recorded by the camera for moving image regions, with the image region being anonymized corresponding to an image region that has moved.

6. The cooking appliance of claim 1, wherein the image processing facility is configured to carry out an object recognition with regard to persons, with the image region being anonymized corresponding to an image region associated with a person recognized by the object recognition.

7. The cooking appliance of claim 1, further comprising a person recognition facility configured to identify a presence of a person in front of the cooking appliance.

8. The cooking appliance of claim 7, wherein the person recognition facility comprises an IR sensor and/or an ultrasound sensor.

9. The cooking appliance of claim 1, further comprising a data transfer facility configured to transfer the image recorded by the camera to an external instance.

10. The cooking appliance of claim 1, wherein the image processing facility is a component of the cooking appliance.

11. A method for operating a cooking appliance, said method comprising:
   recording by a camera an image of a cooking compartment of the cooking appliance;
   recognizing a presence of a person in front of the cooking appliance;
   anonymizing an image region of the image in response to recognizing the presence of the person in front of the cooking appliance; and
   providing the anonymized image to an image display facility.

12. The method of claim 11, wherein the image display facility is a user terminal.

* * * * *